March 21, 1944.  E. R. ZADEMACH ET AL  2,344,527
FRICTION CLUTCH
Filed July 26, 1941  5 Sheets-Sheet 1
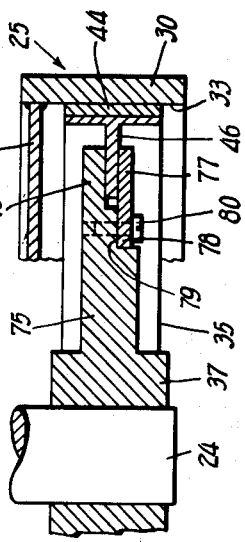
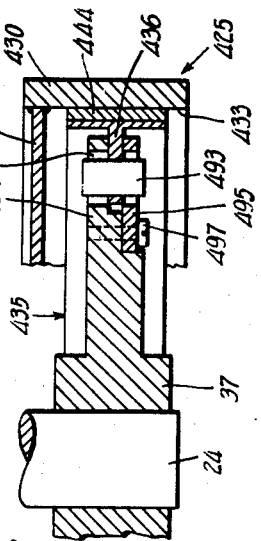
INVENTORS
*Erich R. Zademach and
William W. Clarke*
BY *Moses & Nolte*
ATTORNEYS March 21, 1944. E. R. ZADEMACH ET AL 2,344,527
FRICTION CLUTCH
Filed July 26, 1941 5 Sheets-Sheet 2

INVENTORS
Erich R. Zademach and
William W. Clarke
BY Moses + Nolte
ATTORNEYS

March 21, 1944.    E. R. ZADEMACH ET AL    2,344,527
FRICTION CLUTCH
Filed July 26, 1941    5 Sheets-Sheet 3

INVENTORS
Erich R. Zademach and
William W. Clarke
BY Moses & Nolte
ATTORNEYS

March 21, 1944.　　E. R. ZADEMACH ET AL　　2,344,527
FRICTION CLUTCH
Filed July 26, 1941　　5 Sheets-Sheet 4
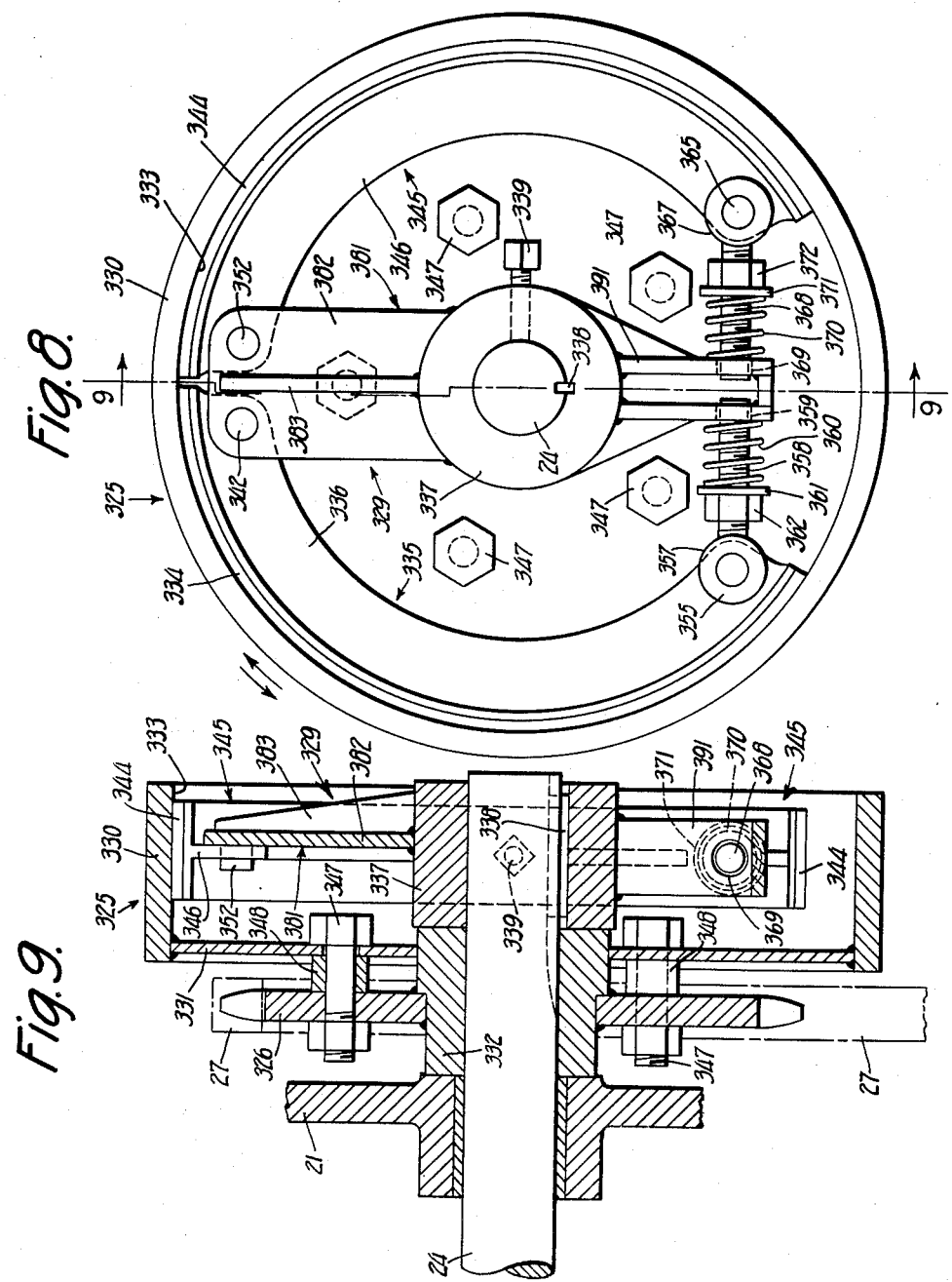
INVENTORS
*Erich R. Zademach and
William W. Clarke*
BY *Moses & Nolte*
ATTORNEYS March 21, 1944.   E. R. ZADEMACH ET AL   2,344,527
FRICTION CLUTCH
Filed July 26, 1941   5 Sheets-Sheet 5

INVENTORS
Erich R. Zademach and
William W. Clarke
BY  Moses & Nolte
ATTORNEYS

Patented Mar. 21, 1944

2,344,527

UNITED STATES PATENT OFFICE 2,344,527

FRICTION CLUTCH

Erich R. Zademach, Elizabeth, and William W. Clarke, Summit, N. J., assignors, by mesne assignments, to Metalwash Machinery Company, Newark, N. J., a copartnership Application July 26, 1941, Serial No. 404,126

9 Claims. (Cl. 64—30)

This invention relates to friction drive clutches and particularly to a clutch of this type adapted to maintain a driving connection which will yield under overload without requiring resetting after the overload is removed.

The general purpose of the invention is to provide a simple, sturdy clutch of this type suitable for driving heavy machinery, which will be positive in action, durable and accessible to adjustment, repair or replacement of the parts. Another purpose is to construct and arrange a clutch of this type so that it may be readily mounted on a drive shaft in a minimum of space, without projecting parts and with the mechanism protected without requiring a special housing.

A feature of the invention is to provide a clutch that will be equally effective when the drive is reversed. The clutch is of the type in which a friction shoe connected to a shaft engages the inner face of a drum; and it has been found that in this construction the shoe has a tendency to shift axially on the drum. The invention includes improved means for restraining such axial movement.

Other objects and advantages of the invention will appear from the following description considered in conjunction with the accompanying drawings in which Fig. 1 is an end elevation of the clutch applied to a machine;

Fig. 2 is a fragmentary radial section on line 2—2 of Fig. 4 through one of the retaining arms;

Fig. 3 is a similar section on line 3—3 of Fig. 10 through a retaining and driving arm;

Fig. 8 is an end elevation of another modified form of clutch;

Fig. 9 is an axial section through the clutch shaft and drive sprocket on line 9—9 of Fig. 8;

Figures 4, 5:
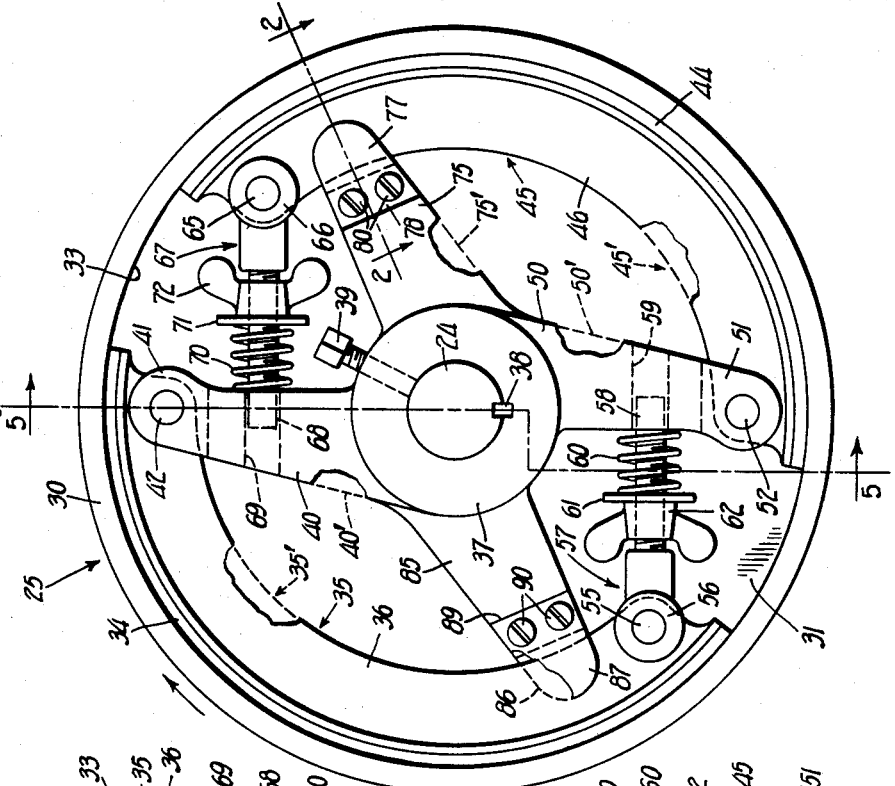
Fig. 4 is an enlarged end elevation of the clutch shown in Fig. 1.
Fig. 5 is an axial section through the clutch shaft and drive sprocket on line 5—5 of Fig. 4.

Referring first to the construction shown in Figs. 1, 2, 4 and 5, the clutch is illustrated in its application to machines for washing or drying articles, of the type disclosed in Zademach Patents No. 2,137,104, issued November 15, 1938, and No. 2,175,677, issued November 10, 1939, in which articles carried on a belt 20 in a sheet metal housing 21 are subjected to washing, drying or other treatment, and are discharged onto apron 22 as belt 20 passes around conveyor roll 23 mounted on shaft 24 extending outwardly through housing 21.

Shaft 24 is driven through clutch 25 by suitable means which in the form illustrated in Figs. 1 and 5 comprises a drive sprocket 26 carrying a chain 27 driven by a suitable source of power, not shown.

Referring to Figs. 4 and 5, clutch 25 comprises a drum 30 carried by and secured to end plate 31 mounted on and rigid with hub 32 rotatively mounted on shaft 24 and carrying sprocket 26. Drum 30 is provided with a cylindrical inner friction face 33 engaged by the lining 34 of clutch shoe 35, lining 34 being made of suitable friction material conforming to friction face 33.

Clutch shoe 35 is provided with a radially extending mounting flange 36, pivotally connected adjacent one end to shaft 24. For this purpose hub 37 fitting shaft 24 is fixed to the shaft as by key 38 and set screw 39 and is provided with drive arm 40, provided at its outer end with fork 41 pivotally connected to flange 36 adjacent an end of shoe 35 by means of pivot pin 42. Shoe 35 and lining 34 extend along substantially less than one-half of the circumference of the drum friction face 33; and a second clutch shoe 45 provided with a similar friction lining 44 is symmetrically located on the other side of shaft 24, similarly mounted on hub 37 by means of drive arm 50 having a fork 51 pivotally connected to flange 46 of shoe 45 by pivot pin 52. Arms 40 and 50 are arranged at opposite sides of hub 37 so that pins 42 and 52 are diametrically aligned, with shoes 35 and 45 extending therefrom in the same circumferential direction.

An arrangement is provided for forcing shoes 35 and 45 outwardly to maintain friction linings 34 and 44 in uniform frictional engagement with friction face 33 during operation. For this purpose flange 36 is connected adjacent its other end through pivot pin 55 with fork 56 of clevis 57 having a shank 58 loosely fitting and longitudinally slidable in bore 59 in arm 50 and encircled by coil spring 60 bearing against arm 50 and washer 61 abutting pressure-adjusting wing nut 62 threaded on shank 58. The corresponding end of shoe 45 is also pressed downwardly by a similar arrangement including pivot pin 65, fork 66 of clevis 67 having shank 68 fitting bore 69 in arm 40 and provided with coil spring 70, washer 71 and wing nut 72.

Owing to the loose fit of shanks 58 and 68 in bores 59 and 69, respectively, a certain amount of axial movement of the resiliently supported ends of shoes 35 and 45 may take place in operation; and a suitable construction mounted on hub 37 is provided to restrain such movement. In the form shown this construction includes an arm 75 extending outwardly from hub 37 and cut away adjacent its end to provide a retaining flange 76 (Fig. 2) overlying the inner face of flange 36 on shoe 35. A detachable retaining plate 77 engages the outer face of flange 46 and is mounted on arm 75, as by fitting its inner end 78 into a recess 79 in arm 75 and holding it in place as by screws 80, the inner margin of end 78 being advantageously straight and fitting against a registering portion of recess 79 to assist in holding plate 77 in place against circumferential friction. Flange 76 and plate 77 are located adjacent clevis 67 and substantially spaced from pivot pin 52. A similar retaining construction for the other clutch shoe 35 is mounted on hub 37, including arm 85 provided with integral retaining flange 86 and detachable retaining plate 87 held in place in recess 89 by screws 90, flange 86 and plate 87 engaging flange 36 adjacent clevis 57.

A strong simple construction of the type described is provided by constructing drive arms 40 and 50 and retaining arms 75 and 85 integral with hub 37, advantageously by forming these parts from a single casting.

Clutch 25 in the form described is constructed and arranged so that a plurality of such clutches may be provided for transmitting the necessary power to heavy machinery. An arrangement of this type is illustrated particularly in Figs. 4 and 5, in which a second clutch 25' is mounted on hub 32 at the opposite side of sprocket 26, facing in the other direction and with similar parts designated by the same members as those of clutch 25, but distinguished by primes. This construction is particularly convenient since clutches 25 and 25' and sprocket 26 constitute a single compact unit which may readily be applied to and removed from the end of shaft 24 and held in place by a single keyway in the shaft.

It has been found that in constructions of the type described there is some difference in the frictional engagement between the shoe linings and the drum when the latter is rotated in different directions. Considering the construction shown best in Fig. 4, if the drum 30 is rotated in a counter-clockwise direction the friction on shoe linings 34 and 44 will exert a counter-clockwise pull on shoes 35 and 45 which tends to make them swing inwardly to a slight extent about pins 42 and 52, thereby reducing the outward pressure on the shoes and the consequent frictional engagement with the drum. However, when the drum is rotated in a clockwise direction as indicated, the friction has the opposite effect, due to the fact that pivot pins 42 and 52 are placed inwardly from the drum by a distance sufficient to permit a slight outward pivoting movement about the pins and a consequent increase in pressure.

In certain instances it is desirable to construct the clutch so that it will transmit the drive movement with equal efficiency in either direction of rotation; and constructions operating in this manner are illustrated in Figs. 6–11. One modified form illustrated in Figs. 6–7 employs two clutch units of the type described in connection with clutch 25, but with the clutch shoes of one unit extending circumferentially from the supporting pivots in a direction opposite to the clutch shoes of the other unit. These figures also illustrate an arrangement for connecting multiple clutch units to a single drive, utilizing a single common drum for all of the units.

In this form a drive pinion 126 is rotatively mounted on shaft 24 outside of housing 21 and meshes with drive gear 127 which is rotated alternately in opposite directions by any source of power, not shown, this arrangement being commonly employed in connection with apparatus which requires forward and return movements in succession. The end plate 131 of drum 130 is rigidly mounted on an extension of the hub 128 of drive pinion 126. The inner friction clutch unit 129 is mounted on shaft 24 in contact with hub 128 and includes hub 137 held against rotation on shaft 24 by key 138, clutch shoes 135 and 145 being provided with friction linings 134 and 144 frictionally engaging the friction face 133 of drum 130, together with parts connecting hub 137 and said brake shoes for supporting and operating the shoes identical with those described in connection with Figs. 1, 2, 4 and 5 and indicated by the same numerals with the addition of an initial numeral 1. In the specific arrangement shown in Figs. 6 and 7, clutch shoes 135 and 145 extend in a clockwise direction from pivot pins 142 and 152.

Mounted on shaft 24 at the opposite side of hub 137 and separated therefrom by a spacer 143 is an outer friction clutch unit 229 which may be identical with inner friction clutch unit 129, except that the clutch shoes extend from their pivots in the opposite direction; and the corresponding parts of clutch unit 229 are designated by the same numerals as parts of the clutch construction shown in Figs. 1, 2, 4 and 5 with the addition of an initial numeral 2.

Figure 6:
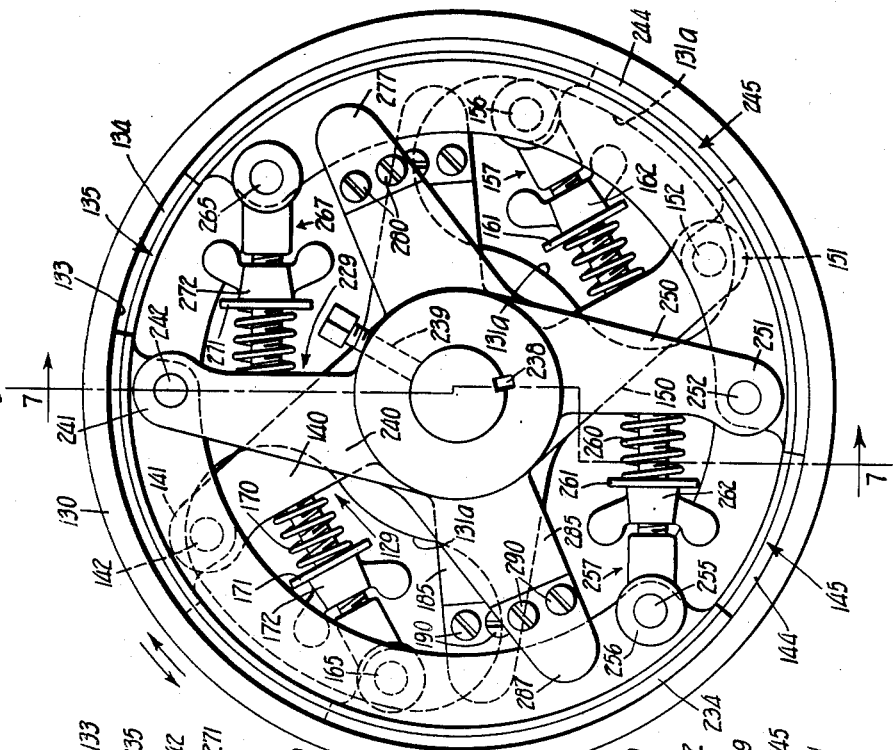
Fig. 6 is an end elevation of a modified clutch construction particularly adapted for driving in either direction.
Figure 7:
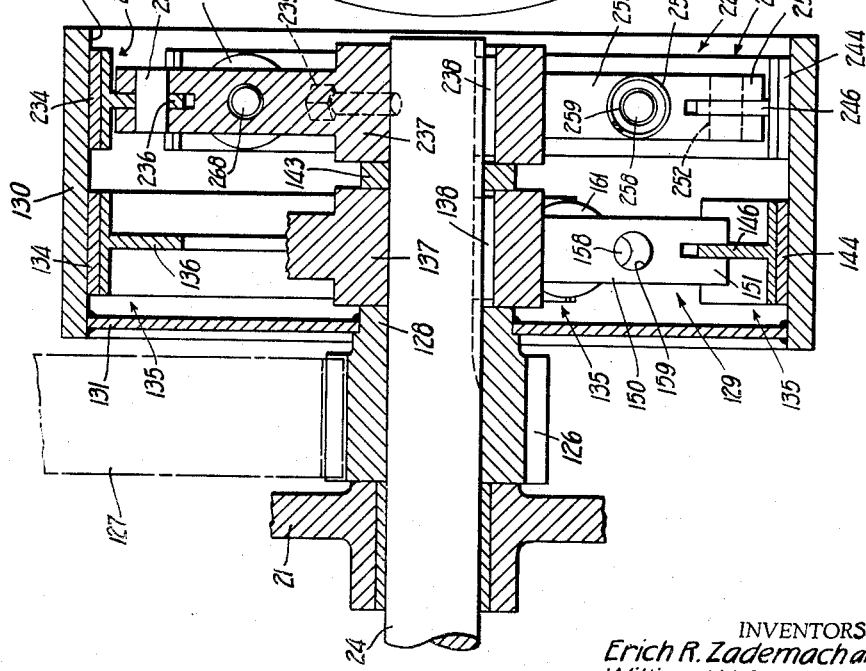
Fig. 7 is an axial section through the clutch shaft and drive gear on line 7—7 of Fig. 6.

As already indicated, a single drum 130 is employed to engage both friction clutch units 129 and 229; but it will be appreciated that this is not restricted to an arrangement including clutch units whose shoes extend in opposite circumferential directions, since obviously the drum construction of Figs. 6 and 7 may be employed with a plurality of clutch units arranged as shown in Figs. 4 and 5, and likewise the inner portions of the structure shown in the latter figures may be arranged with shoe extending in the same manner as that disclosed in Figs. 6 and 7. In the construction shown in these figures it is not necessary to employ a set screw connecting hub 137 to shaft 24, since the set screw 239 of the outer unit 229 is sufficient to hold unit 129 likewise against longitudinal movement on shaft 24.

Adjustments of the nuts 262, 272 and the nuts 262', 272' may be made from the outer end of the drum 130 which is open. The plate 131, to which the drum 130 is secured, may, however, be provided with slots 131a through which a suitable tool may be inserted to the nuts 262' and 272' to assist in adjusting said nuts.

Another modification suitable for driving shaft 24 in either direction with equal efficiency is illustrated in Figs. 8 and 9. This embodiment includes a hub 332 rotatively mounted on shaft 24 against housing 21 and carrying drive sprocket 326 which in this instance is detachably connected to the end plate 331 of drum 330 by a plurality of bolts 347 symmetrically spaced about hub 332, said bolts passing through spacers 348 interposed between the body of sprocket 326 and end plate 331 to provide adequate clearance for chain 27.

A friction clutch unit 329 is mounted on shaft 24 and is maintained in frictional driving engagement with the inner cylindrical friction face 333 of drum 330. Unit 329 includes a hub 337 on shaft 24 held against rotation on the shaft by key 338 extending into said hub and shaft, and against longitudinal movement on the shaft by set screw 39. A shoe-supporting frame 381 comprises a pivot plate 382 extending upwardly from hub 337 in a plane at right angles to the axis of shaft 24, being reinforced by radial web 383 fixed to the outer face of plate 382 and to hub 337. Pivot pins 342 and 352 fixed to plate 382 at either side of web 383 extend through mounting flanges 336 and 346 of clutch shoes 335 and 345 close to the adjacent upper ends of said shoes, which are provided with friction linings 334 and 344 fitting against friction face 333.

Frame 381 also includes a spring abutment arm 391 fixed to hub 337 and extending outwardly into register with the lower ends of clutch shoes 335 and 345. Clevises 357 and 367 are pivoted to the lower end portions of flanges 336 and 346 by pivot pins 355 and 365, and are provided with shanks 358 and 368 loosely slidable in bores 359 and 369 in abutment arm 391. Coil springs 360 and 370 bear against arm 391 and against washers 361 and 371 held adjustably in position by nuts 362 and 372.

In this arrangement, while the arcuate extent of the shoes 335 and 345 is advantageously substantially the same as in the other forms previously described, it is desirable to arrange the upper ends of the shoes in close juxtaposition, allowing just enough space for complete freedom of action, and to space the lower ends of the shoes by a correspondingly increased distance, whereby clevises 357 and 367 may be substantially in alignment, while a large proportion of the thrust of springs 360 and 370 is exerted radially and is effective to hold the shoe linings 334 and 344 against the drum 330.

Figure 10:
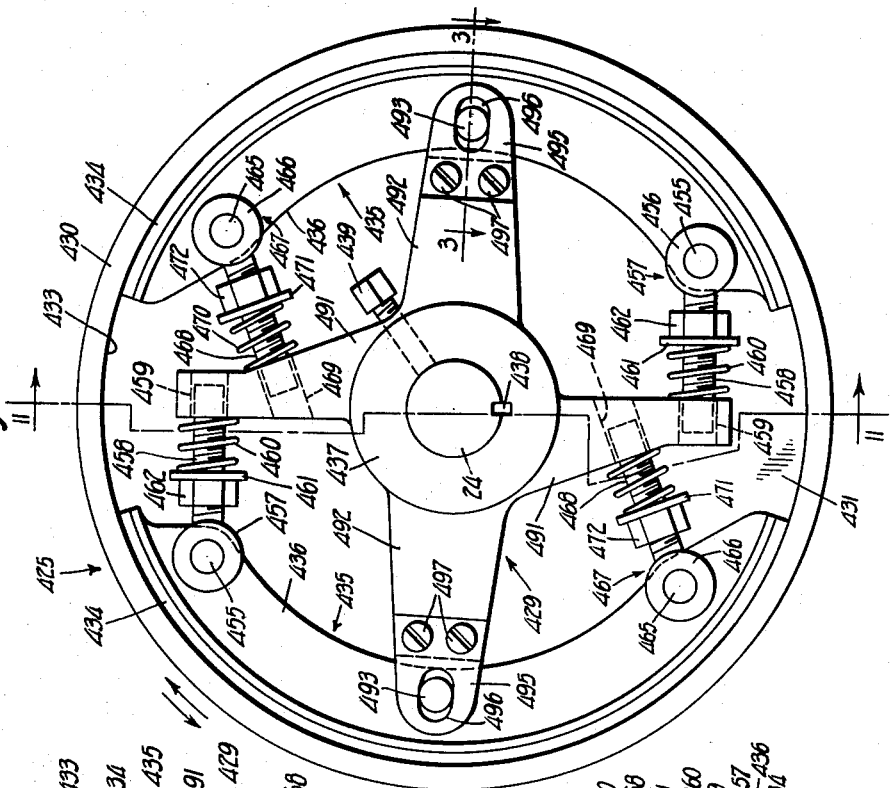
Fig. 10 is an end elevation of still another modified type of clutch.
Figure 11:
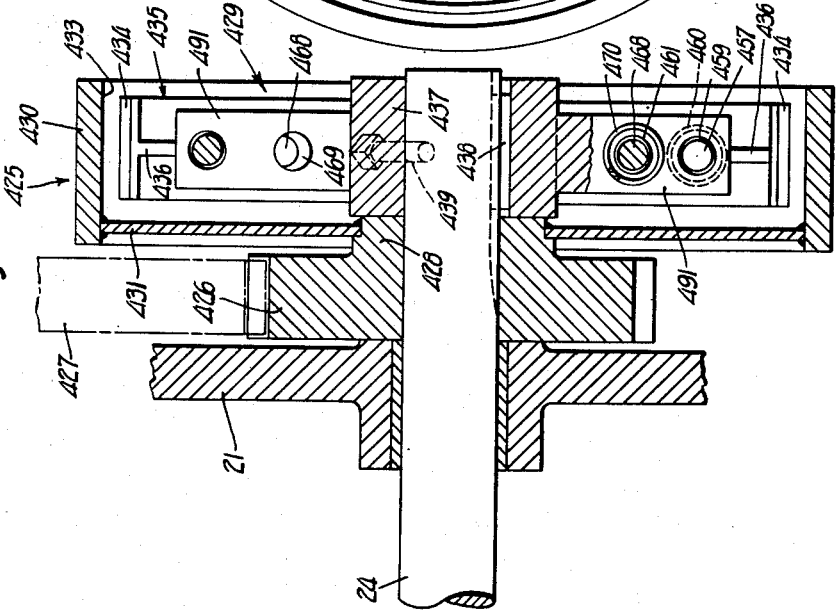
Fig. 11 is an axial section on line 11—11 of Fig. 10 showing the shaft and clutch drive.

Another specific embodiment is illustrated in Figs. 10 and 11, and likewise incorporates a single friction clutch unit 429, a construction which will operate with equal frictional resistance in either direction of rotation. In this embodiment a different principle of shoe support is employed, eliminating the uneven frictional effect due to pivotally mounting each shoe adjacent one end.

The disclosed construction includes a drive pinion 426 rotatively mounted on shaft 24 against housing 21 and driven by drive gear 423. Pinion hub 428 has secured thereto the end plate 431 of drum 430 fixed thereto, the construction to this point being substantially the same as that in Figs. 6 and 7.

The clutch unit 429 comprises a hub 437 fitted on shaft 24, held against rotation thereon by key 438 and against endwise movement by set screw 439. Hub 437 carries oppositely disposed drive arms 492, each engaging a pivot pin 493 located at substantially the circumferential center of mounting flange 436 of clutch shoe 435 provided with friction lining 434 fitting friction face 433 of drum 430.

The connection between arms 492 and flanges 436 is arranged to permit radial movement while substantially preventing circumferential movement of said flanges and shoes 435 relative to arms 492. For this purpose the outer end of each arm 492 is forked at its outer end to form inner plate 494 bearing against the inner face of flange 436 and outer plate 495 (Fig. 3) bearing against the outer face of the flange. The plates 494 and 495 are provided with registering slots 496 fitting over pin 493, the slots being radially elongated to permit radial movement of flange 436 between the plates but having a snug driving fit against the sides of the pins. Outer plate 495 may be separable and suitably held in place as by screws 497, to facilitate removal of the shoes.

A construction is provided for resiliently pressing each end of each shoe 435 outwardly to maintain frictional engagement with the drum 430. The construction disclosed for this purpose includes symmetrical oppositely disposed spring abutment arms 491 rigid on hub 437 intermediate arms 492. Each mounting flange 436 is provided adjacent one end with a pivot pin 455 engaging a clevis 457 loosely fitting into a bore 459 in an abutment arm 491 and pressed outwardly by coil spring 460, the construction being substantially the same as that described in connection with clevis 357 and spring 360. The other end of each mounting flange 436 is provided with a pivot pin 465 engaging a clevis 467 extending into a bore 469 in an abutment arm 491, and pressed outwardly by coil spring 470, the construction and arrangement being similar to that of clevises 457 except that each bore 469 is advantageously located radially inward from adjacent bore 456 and at an angle thereto, and the face of arm 491 engaged by each spring 470 is advantageously normal to the direction of thrust of the spring.

In the various illustrated embodiments in the invention a friction clutch driving arrangement has been provided which may be readily mounted on a drive shaft to provide a yielding connection between said shaft and a drive member mounted on the shaft. The construction takes up only a small amount of space lengthwise of the shaft, and the few internal parts are effectively housed by the drum and end plate construction. At the same time they are arranged for ready accessibility, permitting adjusting of the friction by turning nuts 72 to assure equal bearing of the shoes against the drum and to permit the driven mechanism to stop under any desired overload without breaking any element of the clutch, leaving the drive ready for operation without further manipulation when the overload is removed.

This type of drive has been found to be particularly advantageous in article handling apparatus of the type indicated, in which the articles sometimes become jammed on the conveyor; and the friction drive disclosed herein can be set to permit slippage at a pressure which will be insufficient to damage any particular type of article jammed on the conveyor.

The clutch drive is conveniently constructed for sale in units, any number of which may be mounted on the shaft to provide the necessary driving torque without requiring the use of clutches of various sizes or of excessive sizes. Special provision has been made to facilitate ready removal of the clutch shoes for inspection or replacement of the lining, and to prevent lateral slip of the shoes which would throw them out of register and cause excessive and uneven wear. Special provision has also been made for uniform driving friction in both directions of rotation. All of the various types of construction described are simple, strong and positive in action, and employ interchangeable parts.

We have described what we believe to be the best embodiments of our invention. We do not wish, however, to be confined to the embodiments shown, but what we desire to cover by Letters Patent is set forth in the appended claims.

We claim:

1. A friction clutch shaft drive construction comprising a rotatable drive member coaxial with the shaft, a concentric drum structure having a drive connection with said member, and a friction drive structure mounted on the shaft and frictionally engaging the drum structure, said drive structure including a supporting structure fixed to the shaft, a friction shoe pivotally connected adjacent one end to the supporting structure and extending therefrom along the drum structure in one direction, a second friction shoe pivotally connected adjacent one end to the supporting structure and extending therefrom along the drum structure in the opposite direction, and pressure devices arranged to maintain the other ends of the shoes in yieldable frictional engagement with the drum.

2. A friction clutch construction as set forth in claim 1 in which the shoes are in radial alignment.

3. A shaft drive construction comprising a drive member rotatively mounted coaxially with the shaft, a concentric drum structure having a drive connection with said member, and a drive unit on the shaft located within and in frictional engagement with the drum structure, the drive unit including a hub on the shaft, opposed arcuate friction shoes normally maintained in internal frictional engagement with the drum structure, supports on the hub for the shoes each pivotally engaging an end portion of a shoe, and spring members each connected to the hub and bearing outwardly against the other end portion of a shoe.

4. A shaft drive construction as set forth in claim 3 in which at least two of the shoes extend circumferentially along the drum from the points of pivotal engagement in opposite directions, arranged to transmit power equally in either direction of rotation.

5. A shaft drive construction as set forth in claim 3 in which the drive unit includes a plurality of sets of friction shoes axially spaced along the shaft, each set including a shoe extending circumferentially around the drum structure from the point of pivotal engagement in a direction opposite to a shoe in another set, arranged to transmit power equally in both directions of rotation.

6. A shaft drive construction comprising a drive hub rotatably mounted on the shaft, a drive member conected to the drive hub, a concentric drum structure mounted on the drive hub, and a drive unit on the shaft located within and in frictional engagement with the drum structure, including a hub fixed to the shaft, a support rigidly carried by the latter hub, a friction shoe pivotally connected to the support for rotation about an axis fixed with respect to said support and frictionally engaging the drum structure, and spring means carried by the latter hub and engaging the shoe at a section spaced from said pivotal axis for maintaining said shoe in frictional engagement with the drum structure, whereby upon rotation of said drum in a direction towards said axis and away from said spring means the frictional engagement of said drum with said shoe urges said shoe to swing about said pivotal axis in a direction to urge the spring-pressed section of said shoe outwardly into drive engagement with said drum, and upon rotation of said drum in an opposite direction said shoe is swung about said pivotal axis to reduce the drive pressure between said shoe and said drum.

7. A shaft drive construction as set forth in claim 6 in which the drum structure includes two spaced drums mounted on the drive hub at opposite sides of the drive member and two drive units on the shaft each engaging one of the drums, the shoes of each of said drums extending in opposite directions, whereby upon rotation of said drums in one direction one of said shoes is drivingly engaged by its respective drum while the other shoe is rendered inoperative, and upon rotation of said drums in an opposite direction the first-mentioned shoe is rendered inoperative while the second-mentioned shoe is drivingly engaged by its respective drum.

8. A shaft drive construction comprising a drive member rotatively mounted coaxially with the shaft, a coaxial drum structure having a drive connection with the member, and a drive unit on the shaft located within and in frictional engagement with the drum structure, including a hub on the shaft, a friction shoe engaging the drum, a support for the shoe carried by the hub and pivotally engaging an end portion of the shoe, spring means carried by the hub for urging the shoe against the drum structure, and a restraining member mounted on the hub and engaging the shoe at a point spaced from said end portion, arranged to prevent substantial axial movement of the shoe on the drum.

9. A shaft drive construction as set forth in claim 8 including a pair of opposed shoes, pivotal supports therefor carried by the hub engaging each shoe adjacent an end thereof, and restraining members carried by the hub and engaging each shoe adjacent the other end thereof.

ERICH R. ZADEMACH.
WILLIAM W. CLARKE.